(12) United States Patent
Stuart Fiske et al.

(10) Patent No.: US 6,453,408 B1
(45) Date of Patent: Sep. 17, 2002

(54) SYSTEM AND METHOD FOR MEMORY PAGE MIGRATION IN A MULTI-PROCESSOR COMPUTER

(75) Inventors: James A. Stuart Fiske, Palo Alto; David Edward McCracken, San Francisco; Leonard Mark Widra, Saratoga, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,606

(22) Filed: Sep. 30, 1999

(51) Int. Cl.[7] ............... G06F 15/16; G06F 13/16; G06F 12/08
(52) U.S. Cl. ............... 712/29; 709/216; 711/141; 711/145; 711/152; 711/219
(58) Field of Search ................... 712/206, 203, 712/9, 211, 29, 213, 32, 215, 248, 227, 228, 224, 30; 711/170, 148, 159, 169, 173, 172, 171, 168, 216, 213, 219, 221, 209, 208, 206, 204, 145, 143, 142, 144, 141, 125, 130, 123, 152; 714/39, 11; 709/216

(56) References Cited

U.S. PATENT DOCUMENTS 5,237,673 A * 8/1993 Orbits et al. ............... 711/170
5,269,013 A * 12/1993 Abramson et al. .......... 711/170

* cited by examiner

Primary Examiner—Daniel H. Pan
(74) Attorney, Agent, or Firm—Baker Botts L.L.P.

(57) ABSTRACT

A method for controlling memory page migration in a parallel processor computer (10) is provided that comprises requesting access to a memory page (14) by a requester processor (206). The method then determines whether the requester processor (206) is a local processor or a remote processor. The method then increments a local access counter (52) and identifies the local access counter (52) as an incremented counter in response to determining that the requester processor (206) is a local processor. If the requester processor (206) is determined to be a remote processor, the method increments a remote access counter (54) and identifies the remote access counter (54) as the incremented counter. The method next sets a threshold processing indicator to a positive value if the incremented counter exceeds a value threshold (58) or if a difference between the local access counter (52) and the remote access counter (54) exceeds a difference threshold (62). The method then generates a system interrupt in response to a positive threshold processing indicator.

18 Claims, 5 Drawing Sheets

SYSTEM AND METHOD FOR MEMORY PAGE MIGRATION IN A MULTI-PROCESSOR COMPUTER

TECHNICAL FIELD OF THE INVENTION

This invention relates in general to the field of computer memory systems, and more particularly to a system and method for memory page migration in a multiprocessor computer.

BACKGROUND OF THE INVENTION

Multiprocessor computers often include a large number of computer processors that may operate in parallel. One example of parallel processing computer architecture is Cache-Coherent multiprocessors with Non-Uniform Memory Access (ccNUMA) architecture. Non-Uniform Memory Access (NUMA) architecture is a type of parallel processing architecture in which each processor has its own local memory but can also access memory owned by other processors. The parallel processing architecture is referred to as non-uniform because memory access times are faster when a processor accesses its own local memory as compared to when a processor borrows memory from another processor.

Cache-coherent multiprocessors with non-uniform memory access have become quite attractive as computer servers for parallel applications in the field of scientific computing. These multiprocessor computers combine scalability with a shared memory programming model thereby discharging the applications designer from data distribution and coherency maintenance. Cache locality, load balancing and scheduling remain of crucial importance. Large caches used in scalable shared memory architectures can avoid high memory access times if data is referenced within the address scope of the cache. Locality is the key issue to multiprocessor performance. In other words, the closer the memory is to a processor that accesses that memory, the faster the access times. This translates to enhanced multiprocessor computer performance.

Some multi-processing computer architectures provide for movement of memory pages such that memory pages are moved close to the processors that access those memory pages. Current systems for memory page movement, or page migration, have incurred excessive overhead that negatively impacts multiprocessor computer performance. Therefore, it is desirable to provide a more efficient manner of handling page migration within a multiprocessor computer.

SUMMARY OF THE INVENTION

From the foregoing, it may be appreciated that a need has arisen for a system and method for memory page migration in a multiprocessor computer that provides more efficient memory page migration. In accordance with the present invention, a system and method for memory page migration in a multiprocessor computer are provided that substantially eliminate and reduce disadvantages and problems associated with conventional memory page migration techniques.

According to an embodiment of the present invention, a method for controlling memory page migration in a parallel processor computer is provided that includes requesting access to a memory page by a requester processor. The method next determines whether the requester processor is a local processor or a remote processor. The method then either increments a local access counter in response to the requester processor being a local processor or increments a remote access counter in response to the requester processor being a remote processor. The access counter that was incremented is then referred to as an incremented counter. The method then sets a threshold processing indicator to a positive value in response to the incremented counter being greater than or equal to a value threshold. The method then generates a system interrupt in response to a positive threshold processing indicator.

In another embodiment of the present invention, the method for controlling memory page migration also includes computing a difference between the local access counter and the remote access counter and then setting the threshold processing indicator to a positive value in response to the difference being greater than or equal to a difference threshold. In yet another embodiment of the present invention, the method for controlling memory page migration in a parallel processor computer described above is performed with every Nth access to the memory page. A page access counter tracks a number of accesses to the memory page. When the page access counter reaches N, the page counter is initialized with the zero and the method for controlling memory page migration is performed.

The present invention provides various technical advantages over conventional page migration techniques. For example, one technical advantage is that only two counters are used. for each memory page thereby reducing overhead associated with previous page migration techniques which used a counter for each parallel processor in each memory page. Another technical advantage is that the page migration technique checks for a page migration situation with every Nth access to the memory page thereby reducing overhead associated with the page migration technique. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, and in which.

DETAILED DESCRIPTION OF THE INVENTION

Figure 1:
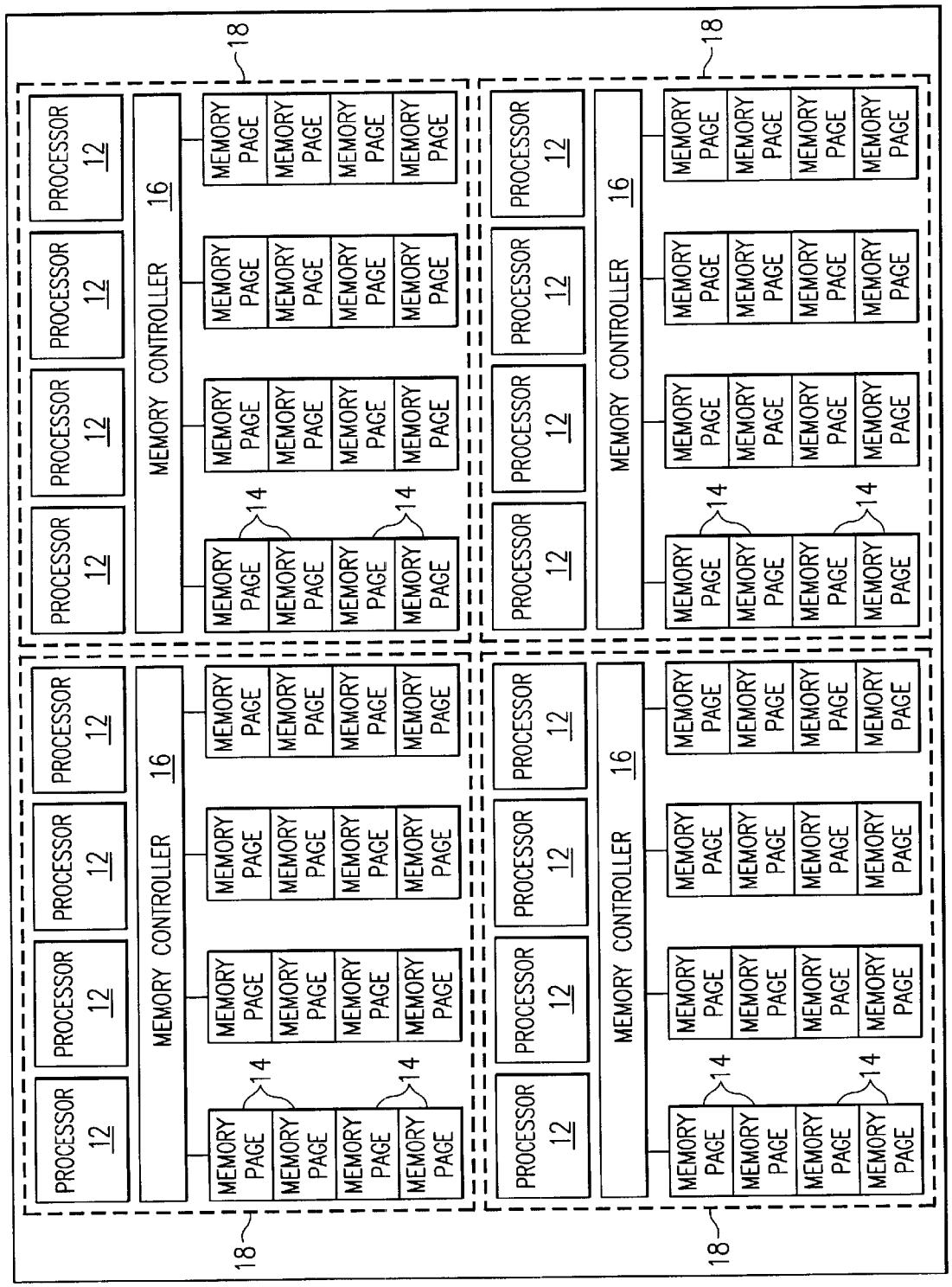
FIG. 1 illustrates a multiprocessor computer that includes a plurality of processors and a plurality of memory pages.

Referring to FIG. 1, a parallel processor computer is generally indicated at 10. Parallel processor computer 10 includes a plurality of processors 12 and a plurality of memory pages 14. The plurality of processors 12 and plurality of memory pages 14 may be subdivided into a set of clusters 18 where each cluster 18 includes a subgroup of the plurality of processors 12 and a subgroup of the plurality of memory pages 14. Each cluster 18 includes a memory controller 16 to control the group of memory pages 14 associated with that particular cluster 18. Although the present invention will be discussed in terms of Cache Coherent Non-Uniform Memory Access (ccNUMA) architecture, any suitable parallel processing architecture may be used.

In certain parallel processing computer architectures, each processor 12 may utilize and access any memory page 14 within parallel processor computer 10 regardless of the memory page's proximity to the processor 12. A processor 12 that requests access to a memory page 14 may be referred to as a requester processor. A processor 12 may be closer to some memory pages 14 than to others. The nearby memory pages 14 may be referred to as local memory pages. The further an accessed memory page 14 is from the requester processor 12, the more time-consuming (slower) the memory access becomes. In order to optimize memory accesses, the accessed memory page 14 may be moved closer to the requester processor 12. This reduces the time used for memory accesses thereby increasing the processing speed of parallel processor computer 10. The movement of memory pages 14 within parallel processor computer 10 may be referred to as page migration.

FIG. 1 illustrates one embodiment of parallel processor computer 10. In that embodiment, each of four clusters 18 includes four processors 12 giving a total of sixteen processors 12 for parallel processor computer 10. In addition, each cluster 18 includes a memory controller 16 and sixteen memory pages 14. Although the present invention will be discussed with relation to the embodiment illustrated in FIG. 1, any suitable number of processors 12 and memory pages 14 may be used. In addition, any suitable division of processors 12 and memory pages 14 may be used to form each cluster 18. For example, there may be only one cluster 18 for parallel processor computer 10, or each cluster 18 may include a different number of processors 12 and memory pages 14.

Figure 2:
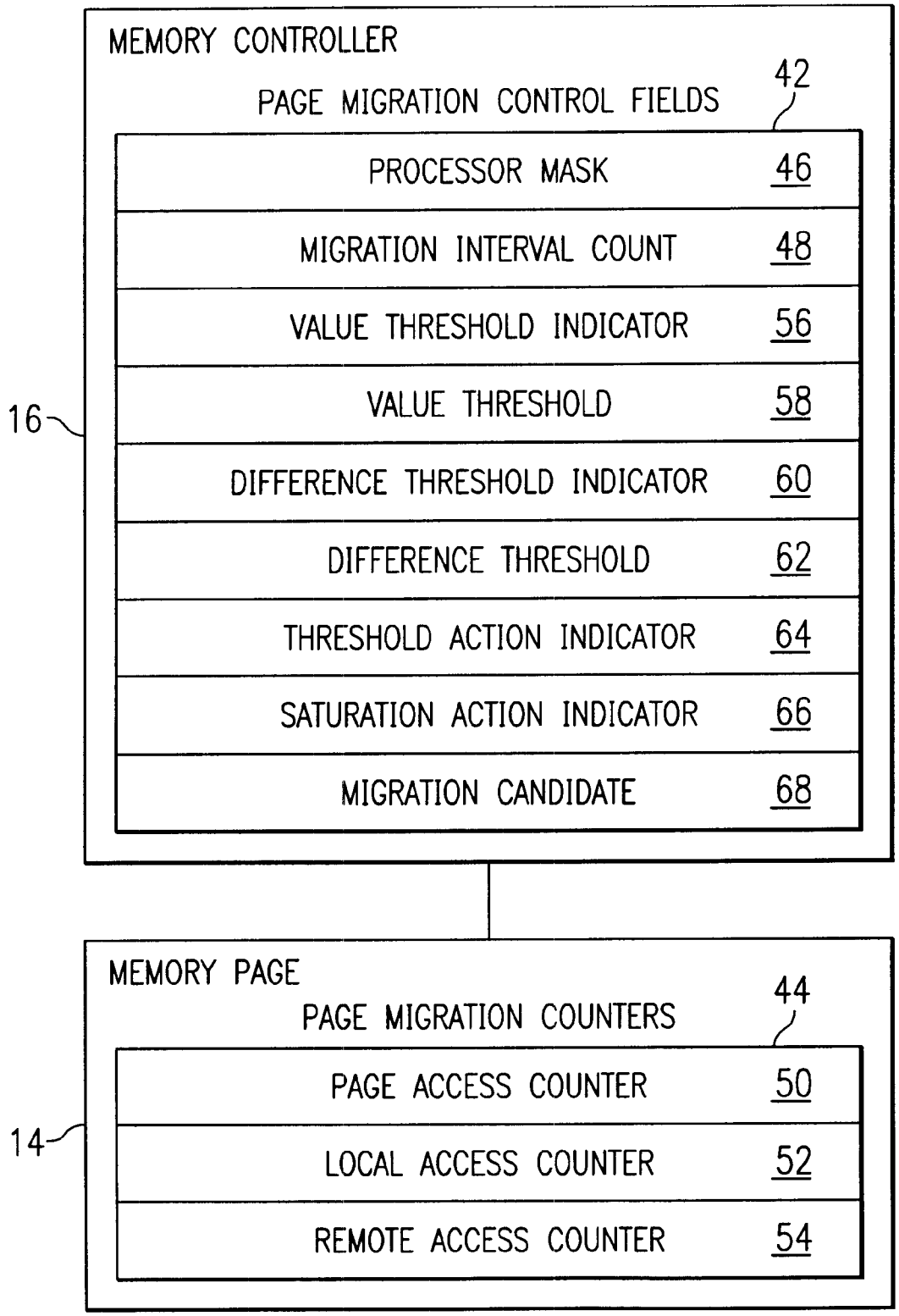
FIG. 2 illustrates a memory controller for controlling a group of memory pages in the multiprocessor computer.

Referring to FIG. 2, page migration control fields 42 in memory controller 14 and page migration counters 44 in memory page 14 are illustrated. Each cluster 18 in parallel processor computer 10 has a memory controller 16 for controlling a subgroup of memory pages 14 associated with the cluster 18. Memory controller 16 includes page migration control fields 42, and memory page 14 includes page migration counters 44.

Page migration counters 44 includes page access counter 50, local access counter 52 and remote access counter 54. Page access counter 50 contains the total number of accesses to memory page 14 since the last page migration processing. Page access counter 50 is used in conjunction with migration interval count 48 to determine when page migration processing occurs. In one embodiment, page access counter 50 is initialized with zeroes each time page migration processing occurs. Thus, page access counter 50 counts from zero to the migration interval count 48 before being reset to zero. Migration interval count 48 defines the interval between each page migration processing. In another embodiment, page access counter 50 is a running count that is divided by migration interval count 48 to determine when page migration processing might occur. In that embodiment, page migration processing occurs when the remainder of page access counter divided by migration interval count 48 is zero.

Local access counter 52 tracks the number of accesses to memory page 14 by a local processor 12 as defined by processor mask 46. Remote access counter 54 tracks the number of accesses to memory page 14 by a remote processor 12 as defined by processor mask 46. Since page migration processing occurs every Nth access to memory page 14 as defined by migration interval count 48, the counters in page migration counters 44 and the control fields in page migration control fields 42 are updated and checked every Nth access to memory page 14.

Page migration control fields 42 includes a processor mask 46, a migration interval count 48, a value threshold indicator 56, a value threshold 58, a difference threshold indicator 60, a difference threshold 62, a threshold action indicator 64, a saturation action indicator 66, and a migration candidate 68. Processor mask 46 is used to determine whether a processor 12 requesting access to a memory page 14 is a local processor or a remote processor with respect to the requested memory page 14. In one embodiment, the local processor/remote processor determination is performed at the cluster 18 level. Therefore, each processor 12 in a cluster 18 has a cluster identification. In that embodiment, processor mask 46 is a nine bit mask corresponding to a nine bit cluster identification where "on" bits in the processor mask 46 identify bits of the cluster identification for the cluster 18 to which the requester processor 12 belongs that are relevant to the local/remote processor determination. Certain bits of the cluster identification for the cluster 18 to which the requester processor 12 belongs (requester processor cluster identification) are compared to corresponding bits of the cluster identification for the cluster 18 to which the requested memory page 14 belongs (memory cluster identification) as determined by the "on" bits of the processor mask 46. If the bits of the requester processor cluster identification and the memory cluster identification corresponding to the "on" bits of the processor mask 46 match, the requester processor is considered local with respect to the requested memory page. Each bit in processor mask 46 may thus represent multiple processors 12 depending on where the bit falls in relation to a cluster/processor identification. Therefore, the use of processor mask 46 allows a group of processors to be considered local processors with respect to a given memory page 14.

Migration interval count 48 identifies how often page migration processing occurs for memory pages 14 within the cluster 18 to which memory controller 16 belongs. Page migration processing updates page migration counters 44 and checks for a page migration situation. Page migration processing may occur every Nth access to a memory page 14 as defined by the migration interval count 48 in the memory controller 16 associated with the memory page 14. By limiting page migration processing to every Nth access to memory page 14, the overhead associated with page migration processing is substantially reduced.

Value threshold indicator 56 is a flag that indicates whether value threshold processing has been elected. Value threshold processing generates a system interrupt in response to local access counter 52 or remote access counter 54 exceeding a value threshold 58. In addition to generating a system interrupt, value threshold processing also resets local access counter 52 and remote access counter 54 as determined by a threshold action indicator 64. Value threshold 58 is a number that when equaled or exceeded by either local access counter 52 or remote access counter 54 triggers value threshold processing if the value threshold indicator 56 indicates that value threshold processing has been elected.

Difference threshold indicator 60 is a flag that indicates whether difference threshold processing has been elected. Difference threshold processing generates a system interrupt in response to a difference between local access counter 52 and remote access counter 54 exceeding a difference threshold 62. In addition to generating a system interrupt, difference threshold processing also resets local access counter 52 and remote access counter 54 as determined by a threshold action indicator 64. Difference threshold 62 is a number that when equaled or exceeded by the difference between local access counter 52 and remote access counter 54 triggers difference threshold processing if difference threshold indicator 60 indicates that difference threshold processing has been elected.

Threshold action indicator 64 identifies an action to be taken when either value threshold processing or difference threshold processing has been triggered. The action to be taken may include initializing the counter that was last incremented, initializing both counters, dividing the counter that was last incremented by two, or dividing both counters by two.

Saturation action indicator 66 identifies an action to be taken when either local access counter 52 or remote access counter 54 becomes saturated. Saturation is used here to refer to the highest number that can be represented being reached in local access counter 52 or remote access counter 54.

Migration candidate 68 identifies the processor identification of the requester processor 12 that triggered page migration processing. The processor identification of the requester processor 12 that triggered page migration processing is stored in migration candidate 68 so that parallel processor computer 10 may move memory page 14 to a new location if necessary. In another embodiment, migration candidate 68 identifies the cluster identification of the cluster 18 that includes the requester processor 12 that triggered page migration processing.

Figures 3, 4:
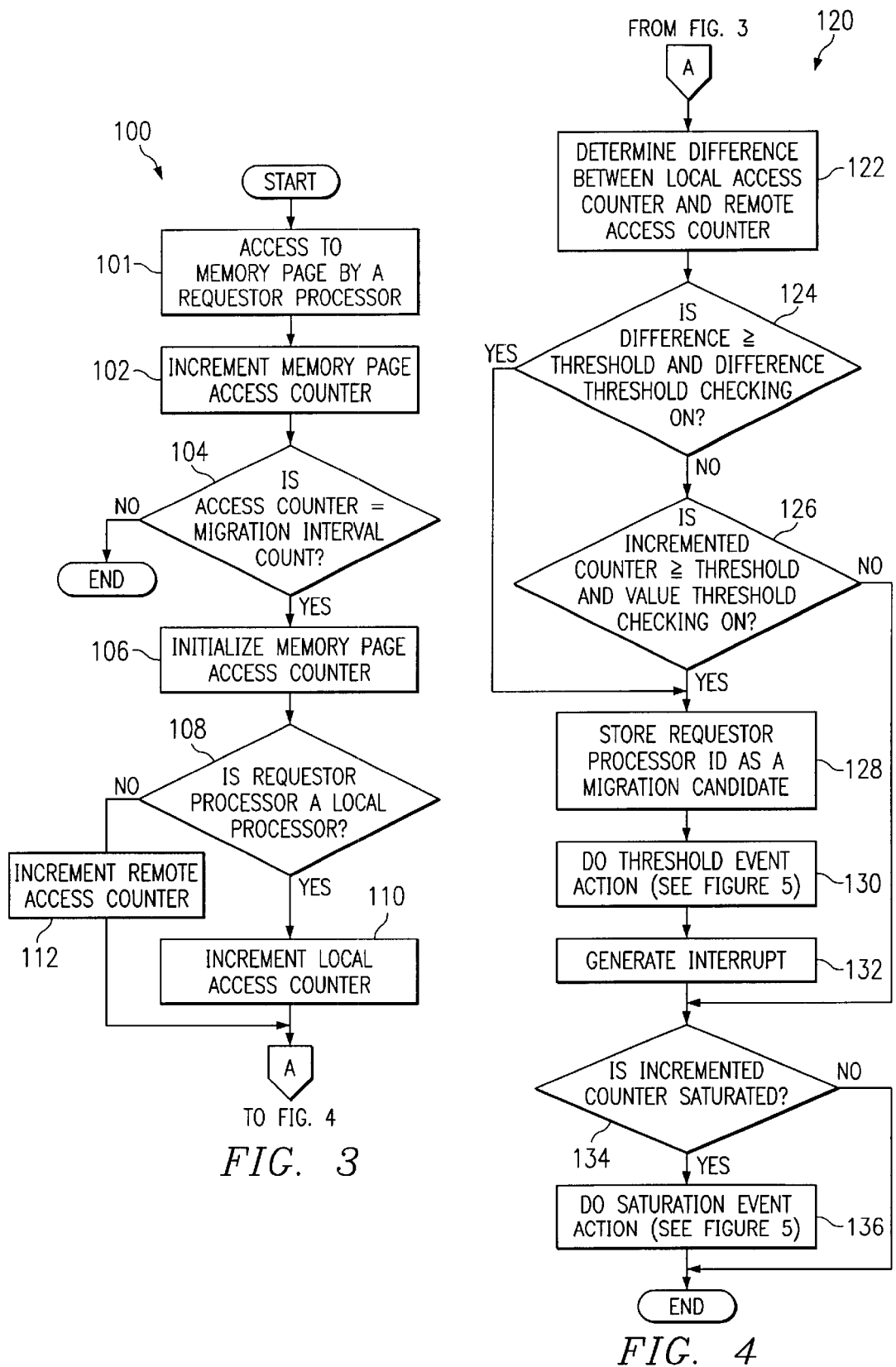
FIG. 3 is a flow diagram illustrating a method for incrementing a local access counter and a remote access counter.
FIG. 4 is a flow diagram illustrating threshold processing that may result in memory page migration.
Figure 5:
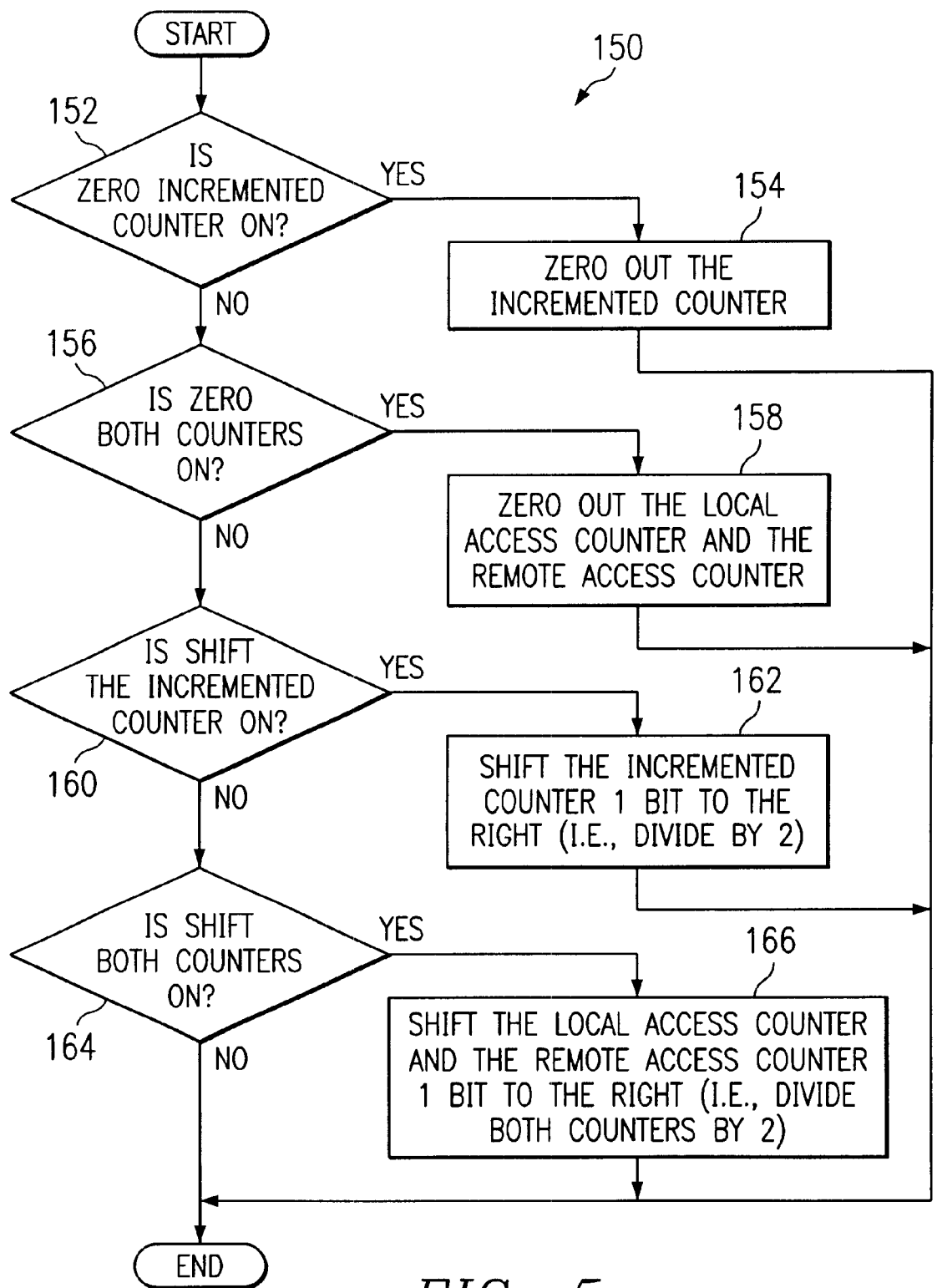
FIG. 5 is a flow diagram illustrating threshold event actions and saturation event actions.

FIGS. 3, 4, and 5 are flow diagrams illustrating page migration processing and the use of page migration control fields 42 and page migration counters 44. Referring to FIG. 3, a method for determining when page migration processing should occur and for updating local access counter 52 and remote access counter 54 is generally indicated at 100. The method begins at step 101 where a requester processor 12 requests access to a memory page 14 associated with a memory controller 16. The method proceeds to step 102 where page access counter 50 is incremented by one.

The method proceeds to decisional step 104 where a decision is made regarding whether page access counter 50 is equal to migration interval count 48. Decisional step 104 causes page migration processing to occur every Nth access to memory page 14 where N is defined by migration interval count 48. By performing page migration processing every Nth access to memory page 14, overhead associated with page migration processing is substantially reduced.

If page access counter 50 is not equal to migration interval count 48, the NO branch of decisional step 104 terminates the method such that the remainder of the page migration processing does not occur until the Nth access to memory page 14. If page access counter 50 is equal to migration interval count 48, the YES branch of decisional step 104 proceeds to step 106 where page access counter 50 is initialized and reset to zero.

The method proceeds to decisional step 108 where a decision is made regarding whether the requester processor 12 is a local processor or a remote processor. In one embodiment, processor mask 46 is a nine bit mask corresponding to a nine bit cluster identification for the cluster 18 to which the requester processor 12 belongs. Processor mask 46 identifies the relevant bits representing which processors/clusters are considered to be a local processor with respect to the requested memory page 14. The requestor processor 12 has a cluster identification for determining whether requester processor 12 is a local or remote processor. Processor mask 46 allows a group of processors 12 to be considered local with respect to a given memory page 14. If the requester processor 12 cluster identification ANDed with processor mask 46 is the same as the requested memory page 14 cluster identification ANDed with processor mask 46, then the access is considered to be local. Otherwise, the access is considered to be remote. In essence, if the bits of the requester processor 12 cluster identification and the requested memory page 14 cluster identification corresponding to the "on" bits of processor mask 46 are the same, the access is considered to be local.

If requester processor 12 is a local processor, the YES branch of decisional step 108 proceeds to step 110 where local access counter 52 is incremented by one. The local access counter 52 is now considered to be an incremented counter. If the requester processor 12 is not a local processor, the NO branch of decisional step 108 proceeds to step 112 where remote access counter 54 is incremented by one. The remote access counter 54 is now considered to be an incremented counter. Both step 110 and step 112 proceed along the same path to the flow diagram of FIG. 4.

Referring to FIG. 4, a method for threshold processing is generally indicated at 120. The method begins at step 122 where a difference between local access counter 52 and remote access counter 54 is determined. The method proceeds to decisional step 124 where a determination is made regarding whether the absolute value of the difference is greater than or equal to difference threshold 62 and whether difference threshold indicator 60 indicates that difference threshold processing has been elected. If both conditions of decisional step 124 are not satisfied, the NO branch of decisional step 124 proceeds to decisional step 126 where a determination is made regarding whether the incremented counter is greater than or equal to value threshold 58 and whether value threshold indicator 56 indicates that value threshold processing has been elected. If both conditions of decisional step 126 are satisfied, the YES branch of decisional step 126 proceeds to step 128. In addition, if both conditions of decisional step 124 are satisfied, the YES branch of decisional step 124 also proceeds to step 128.

In step 128, the requester processor 12 processor identification that triggered page migration processing in decisional step 104 is stored as a migration candidate 68. In another embodiment, the requester processor 12 cluster identification that triggered page migration processing in decisional step 104 is stored as a migration candidate 68. The method proceeds to step 130 where a threshold event action identified by threshold action indicator 64 is performed. FIG. 5 illustrates the various threshold event actions identified by threshold action indicator 64 and will be discussed below.

The method proceeds to step 132 where memory controller 16 generates a system interrupt to parallel processor computer 10. The system interrupt identifies the memory page 14, the memory controller 16 and the migration candidate 68. Parallel processor computer 10 then determines an appropriate action. In one embodiment, parallel processor computer 10 may migrate memory page 14 to be near migration candidate 68. In another embodiment, parallel processor computer 10 may elect to wait for a future system interrupt before migrating any memory pages 14.

After generating the system interrupt, step 132 proceeds to decisional step 134. In addition, if both conditions of decisional steps 124 and 126 are not satisfied, the NO branch of decisional step 126 also proceeds to step 134. In decisional step 134, a determination is made regarding whether the incremented counter is saturated. If the incremented counter is not saturated, the NO branch of decisional step 134 terminates the method. If the incremented counter is saturated, the YES branch of decisional step 134 proceeds to step 136 where a saturation event action identified by saturation action indicator 66 is performed. The saturation event action handles the situation where either local access counter 52 or remote access counter 54 is full. In that situation, future comparisons between local access counter 52 and remote access counter 54 would not be accurate. The various event actions identified by threshold action indicator 64 and saturation action indicator 66 are the same and are illustrated in the flow diagram of FIG. 5. After step 136, the method terminates.

Referring to FIG. 5, the various event actions identified by threshold action indicator 64 and saturation action indicator 66 are generally indicated at 150. In one embodiment, the following four event actions are used: Zero Incremented Counter; Zero Both Counters; Shift the Incremented Counter; and Shift Both Counters. Although the present invention uses the four aforementioned event actions, any suitable event action may be used.

The event action method commences at decisional step 152 where a decision is made regarding whether the Zero Incremented Counter action is elected. If the Zero Incremented Counter action is elected, the YES branch of decisional step 152 proceeds to step 154 where the incremented counter is initialized to zero. After step 154, the method terminates.

If the Zero Incremented Counter action is not elected, the NO branch of decisional step 152 proceeds to decisional step 156 where a determination is made regarding whether the Zero Both Counters action is elected. If the Zero Both Counters action is elected, the YES branch of decisional step 156 proceeds to step 158 where both local access counter 52 and remote access counter 54 are initialized with zero. After step 158, the method terminates.

If the Zero Both Counters action is not elected, the NO branch of decisional step 156 proceeds to decisional step 160 where a determination is made regarding whether the Shift the Incremented Counter action is elected. If the Shift the Incremented Counter action is elected, the YES branch of decisional step 160 proceeds to step 162 where the incremented counter is shifted one bit to the right. In other words, the incremented counter is divided by two. After step 162, the method terminates.

If the Shift the Incremented Counter action is not elected, the NO branch of decisional step 160 proceeds to decisional step 164 where a determination is made regarding whether the Shift Both Counters action is elected. If the Shift Both Counters action is elected, the YES branch of decisional step 164 proceeds to step 166 where both local access counter 52 and remote access counter 54 are shifted one bit to the right. In other words, both local access counter 52 and remote access counter 54 are divided by two. After step 166, the method terminates.

If the Shift Both Counters action is not elected, the NO branch of decisional step 164 terminates the method.

Figure 6:
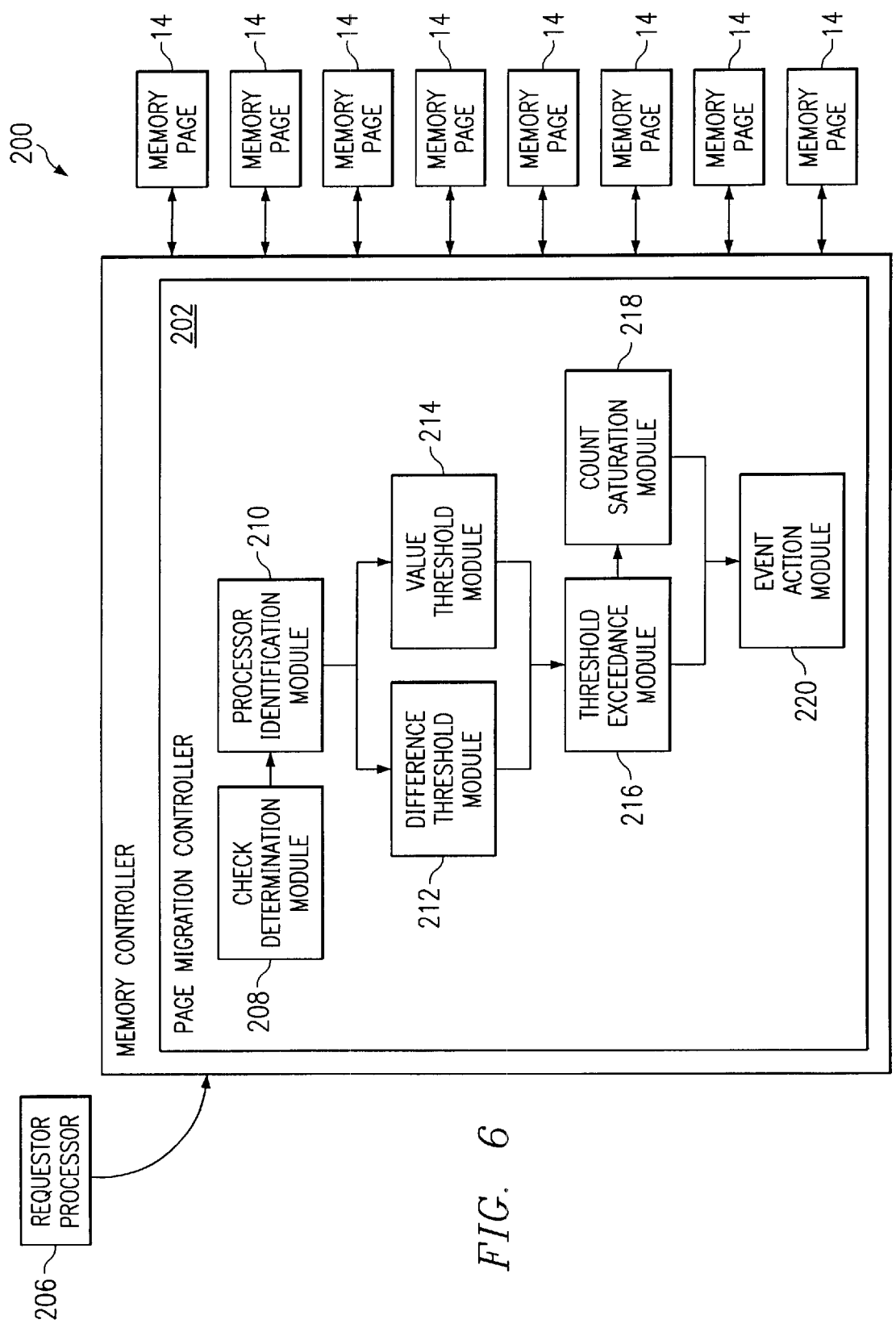
FIG. 6 illustrates processing modules included in each memory controller.

Referring to FIG. 6, a illustrative memory controller of parallel processor computer 10 is generally indicated at 200. Memory controller 200 of parallel processor computer 10 includes a page migration controller 202. Memory controller 200 is coupled to and controls a group of memory pages 14.

Page migration controller 202 performs the page migration processing as previously described with relation to FIGS. 2–5. A requestor processor 206 may request access to a requested memory page 14 controlled by memory controller 200. The request for access is captured by memory controller 200 where page migration controller 202 is invoked. Page migration controller 202 includes a check determination module 208, a processor identification module 210, a difference threshold module 212, a value threshold module 214, a threshold exceedance module 216, a count saturation module 218, and an event action module 220.

Check determination module 208 implements method steps 102, 104, and 106 illustrated in FIG. 3. Check determination module 208 increments page access counter 50 and authorizes continuation of processing through page migration controller 202 by determining whether page access counter 50 is equal to migration interval count 48. If page access counter 50 is equal to migration interval count 48, check determination module 208 initializes page access counter 50 and authorizes continuation through page migration controller 202.

Processor identification module 210 implements method steps 108, 110 and 112 illustrated in FIG. 3. Processor identification module 210 determines whether requester processor 206 is a local processor or a remote processor with respect to the requested memory page 14. Processor identification module 210 uses the previously described method of determining whether requester processor 206 is a local processor or a remote processor using processor mask 46, the requester processor cluster identification, and the requested memory page cluster identification. Processor identification module 210 increments either local access counter 52 or remote access counter 54 dependent upon whether requester processor 206 is a local processor or remote processor. The count that is incremented (local access counter 52 or remote access counter 54) is referred to as the incremented counter.

Difference threshold module 212 implements method steps 122 and 124 illustrated in FIG. 4. Difference threshold module 212 calculates a difference between local access counter 52 and remote access counter 54. Difference threshold module 212 sets a threshold processing indicator to positive in response to the absolute value of the difference being greater than or equal to difference threshold 62 and difference threshold indicator 60 indicating that difference threshold processing has been elected.

Value threshold module 214 implements method step 126 illustrated in FIG. 4. Value threshold module 214 determines whether the incremented counter is greater than or equal to value threshold 58 and whether value threshold indicator 56 indicates that value threshold processing has been elected. If value threshold processing has been elected and the incremented counter equals or exceeds value threshold 58, value threshold module 214 sets the threshold processing indicator to a positive value.

Threshold exceedance module 216 implements method steps 128, 130, and 132 illustrated in FIG. 4. Threshold exceedance module 216 is invoked if the threshold processing indicator is positive. The threshold exceedance module 216. stores the requester processor 206 cluster identification in migration candidate 68. Threshold exceedance module 216 also invokes event action module 220 to reset local access counter 52 and remote access counter 54 as indicated by threshold action indicator 64. Threshold exceedance module 216 also generates a system interrupt to parallel processor computer 10 that identifies the memory controller 200, the memory page 14, and the migration candidate 68.

Count saturation module 218 implements method steps 134 and 136 illustrated in FIG. 4. Count saturation module 218 determines whether the incremented counter has reached its saturation value. If the incremented counter has reached its saturation value, count saturation module 218 invokes event action module 220 to reset local access counter 52 and remote access counter 54 as indicated by saturation action indicator 66.

Event action module 220 implements method steps 152-166 illustrated in FIG. 5. Event action module 220 resets local access counter 52 and remote access counter 54 as previously described in relation to FIG. 5.

Thus, it is apparent that there has been provided, in accordance with the present invention, a system and method for memory page migration in a multiprocessor computer that satisfies the advantages set forth above including improved efficiency for the page migration process. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A method for controlling memory page migration in a parallel processor computer, comprising:

requesting access to a memory page by a requester processor, the memory page belonging to a cluster of processors and memory pages having a memory page cluster identification, the requester processor belonging to a cluster of processors and memory pages having a requester processor cluster identification;

determining whether the requester processor is a local processor or a remote processor;

incrementing a local access counter in response to the requestor processor being a local processor, the local access counter identified as an incremented counter;

incrementing a remote access counter in response to the requester processor being a remote processor, the remote access counter identified as an incremented counter;

setting a threshold processing indicator to a positive value in response to the incremented counter being greater than or equal to a value threshold;

generating a system interrupt in response to a positive threshold processing indicator.

2. The method of claim 1, further comprising:

incrementing a memory page access counter in response to the requester processor requesting access to the memory page;

initiating page migration processing in response to the memory page access counter being greater than or equal to a migration interval count, the migration interval count indicating how often page migration processing should occur.

3. The method of claim 2, further comprising:

initializing the memory page access counter in response to the memory page access counter being greater than or equal to the migration interval count.

4. The method of claim 1, wherein determining whether the requestor processor is a local processor or a remote processor includes:

determining that the requester processor is a local processor in response to the requestor processor cluster identification matching selected bits of the memory page cluster identification according to a local processor bit mask;

determining that the requestor processor is a remote processor in response to the requestor processor cluster identification not matching selected bits of the memory page cluster identification according to the local processor bit mask.

5. The method of claim 1, wherein setting the threshold processing indicator further includes determining whether value threshold processing has been elected.

6. The method of claim 1, further comprising:

storing the requestor processor cluster identification for use as a migration candidate;

resetting the local access counter and the remote access counter; and wherein the system interrupt identifies the memory page, the memory controller, and the migration candidate.

7. The method of claim 6, wherein the step of resetting the local access counter and the remote access counter is selected from the group consisting of:

initializing the incremented counter;

initializing the local access counter and the remote access counter;

dividing the incremented counter by two; and dividing both the local access counter and the remote access counter by two.

8. The method of claim 1, further comprising:

resetting the local access counter and the remote access counter in response to the incremented counter becoming saturated.

9. The method of claim 8, wherein the step of resetting the local access counter and the remote access is selected from the group consisting of:

initializing the incremented counter;

initializing the local access counter and the remote access counter;

dividing the incremented counter by two; and dividing both the local access counter and the remote access counter by two.

10. The method of claim 1, further comprising:

determining a difference between the local access counter and the remote access counter; and setting a threshold processing indicator to a positive value in response to the difference being greater than or equal to a difference threshold.

11. The method of claim 10, wherein setting the threshold processing indicator further includes determining whether difference threshold processing has been elected.

12. A method for controlling memory page migration in a parallel processor computer, comprising:

requesting access to a memory page by a requestor processor;

incrementing a memory page access counter in response to the requester processor requesting access to the memory page;

initiating page migration processing in response to the memory page access counter being greater than or equal to a migration interval count, the migration interval count indicating how often page migration processing should occur and;

initializing the memory page access counter in response to the memory page access counter being greater than or equal to the migration interval count.

13. A memory page migration controller for a parallel processor computer, comprising:

a processor identification module operable to determine whether a requester processor is a local processor or a remote processor with regards to a requested memory page, the requester processor operable to request access to the requested memory page, the requester processor belonging to a cluster of processors and memory pages having a requestor processor cluster identification, the requested memory page belonging to a cluster of processors and memory pages having a memory page cluster identification, the requested memory page controlled by a memory controller, the processor identification module further operable to increment a local access counter in response to determining that the requester processor is a local processor, the local access counter then identified as an incremented counter, the processor identification module further operable to increment a remote access counter in response to determining that the requester processor is a remote processor, the remote access counter then identified as an incremented counter;

a value threshold module operable to set a threshold processing indicator to a positive value in response to the incremented counter being greater than or equal to a value threshold;

a threshold exceedance module operable to set a migration candidate equal to the requestor processor cluster identification in response to a positive threshold processing indicator, the threshold exceedance module further operable to generate a system interrupt identifying the requested memory page, the memory controller, and the migration candidate in response to a positive threshold processing indicator; and an event action module operable to reset the local access counter and the remote access counter in response to a positive threshold processing indicator.

14. The system of claim 13, further comprising:

a check determination module operable to increment a memory page access counter in response to the request for access to the requested memory page, the check determination module further operable to authorize continuation of processing through the memory page migration controller with every Nth request for access to the requested memory page.

15. The system of claim 13, further comprising:

a difference threshold module operable to determine a difference between the local access counter and the remote access counter, the difference threshold module further operable to set a threshold processing indicator to a positive value in response to the difference being greater than or equal to a difference threshold.

16. The system of claim 13, wherein the event action module resets the local access counter and the remote access counter as indicated by a threshold action indicator.

17. The system of claim 16, wherein the threshold action indicator indicates resetting the local access counter and the remote access counter as selected from the group consisting of:

initializing the incremented counter with a value of zero;

initializing both the local access counter and the remote access counter with a value of zero;

dividing the incremented counter by two; and dividing the local access counter and the remote access counter by two.

18. The system of claim 13, further comprising:

a count saturation module operable to determine whether the incremented counter has reached a maximum value, the maximum value representing the largest number that may be stored in the incremented counter; and wherein the event action module is further operable to reset the local access counter and the remote access counter in response to the incremented counter reaching the maximum value.

* * * * *